US012729818B1

(12) United States Patent
Li

(10) Patent No.: US 12,729,818 B1
(45) Date of Patent: Sep. 8, 2026

(54) SPHERICAL LIGHTING FIXTURE

(71) Applicant: Shenzhen HYSIRY Technology Co., Ltd, Shenzhen (CN)

(72) Inventor: Ming Li, Shenzhen (CN)

(*) Notice: Subject to any disclaimer, the term of this patent is extended or adjusted under 35 U.S.C. 154(b) by 0 days.

(21) Appl. No.: 19/214,860

(22) Filed: May 21, 2025

(51) Int. Cl.

| | |
|---|---|
| ***F21S 4/20*** | (2016.01) |
| ***F21V 3/02*** | (2006.01) |
| ***F21V 17/00*** | (2006.01) |
| ***F21Y 107/20*** | (2016.01) |
| ***F21Y 115/10*** | (2016.01) |

(52) U.S. Cl.
CPC ................ *F21S 4/20* (2016.01); *F21V 3/023* (2013.01); *F21V 17/007* (2013.01); *F21Y 2107/20* (2016.08); *F21Y 2115/10* (2016.08)

(58) Field of Classification Search
CPC . F21V 3/02; F21V 3/023; F21V 3/026; F21V 1/06; F21V 17/007; F21S 4/20; F21S 4/15; F21S 4/10; F21Y 2107/20
See application file for complete search history.

(56) References Cited

U.S. PATENT DOCUMENTS 5,632,552 A * 5/1997 Wang ...................... F21V 21/08 362/396
5,645,343 A * 7/1997 Rinehimer ................ F21S 4/10 362/396
6,135,617 A * 10/2000 Lai ........................ F21V 17/007 362/396
6,386,734 B1 * 5/2002 Huang .................. F21V 17/007 362/249.14
6,401,404 B1 * 6/2002 Fillipp ...................... B44C 5/00 40/538
10,161,601 B1 * 12/2018 Chen ......................... F21S 6/00
2013/0240920 A1 * 9/2013 Lin ......................... F21K 9/232 257/89
2017/0248286 A1 * 8/2017 Wouters .................... F21S 8/00
2025/0180177 A1 * 6/2025 Roznovsky ............... F21S 4/10

* cited by examiner

*Primary Examiner* — William N Harris

(57) ABSTRACT

A spherical lighting fixture comprises a fixing assembly composed of two concentric annular bases, with a plurality of mounting holes evenly distributed in a circumferential direction of the annular bases; a plurality of support members, with plug-in structures adapted to the mounting holes provided at their ends; the support members are radially distributed along meridian direction and detachably connected to the fixing assembly through the plug-in structures, jointly forming a spherical support frame; LED light strings, with wires of the LED light strings arranged along the support members; a plurality of smart LED beads are connected to the wires, and the smart LED beads are integrated with logic control chips, which independently control the smart LED beads through address coding. Through the integration of innovative structural design and intelligent control technology, the spherical lighting fixture realizes independent control of each smart LED bead.

4 Claims, 6 Drawing Sheets

SPHERICAL LIGHTING FIXTURE

TECHNICAL FIELD

The invention relates to the technical field of lighting, in particular to a spherical lighting fixture.

BACKGROUND ART

Currently, with the rapid development of LED lighting technology and intelligent control systems, market requirements for lighting products are no longer limited to basic lighting functions, but increasingly emphasize artistic expression, interactive experience, and intelligent control. Traditional spherical lighting fixtures mainly use fixed light sources and simple circuit control. Although they can meet basic needs in terms of lighting effects, they have shortcomings in the following aspects: first, traditional spherical lighting fixtures lack dynamic control capabilities. Most existing products use LED beads with fixed colors and brightness, and their control circuits are relatively simple, only capable of basic switching and dimming functions. They struggle to meet users' demands for personalized and diverse lighting effects such as dynamic patterns, color gradients, and rhythm synchronization. With the rise of smart home and interactive entertainment markets, users have higher requirements for lighting products, which need not only stable lighting functions but also visually dynamic and ever-changing effects; second, existing structural designs also have limitations in assembly and maintenance. The structures of traditional spherical lighting fixtures are mostly integrally cast or welded and fixed. In the event of a failure or the need to replace an LED module, maintenance costs are high and operations are complicated. At the same time, due to the lack of modular assembly design in the structure, the products are not convenient enough during transportation, storage, and on-site installation, making it difficult to meet the market demands for rapid deployment and personalized installation.

SUMMARY OF THE INVENTION

The purpose of the invention is to solve the above-mentioned problems that traditional spherical lighting fixtures lack dynamic control capabilities and that existing structural designs have limitations in assembly and maintenance.

According to one aspect of the invention, the invention provides a spherical lighting fixture, including:

- a fixing assembly composed of two concentric annular bases, with a plurality of mounting holes evenly distributed in a circumferential direction of the annular bases;
- a plurality of support members, with plug-in structures adapted to the mounting holes provided at their ends; the support members are radially distributed along meridian direction and detachably connected to the fixing assembly through the plug-in structures, jointly forming a spherical support frame;
- LED light strings, with wires of the LED light strings arranged along the support members; a plurality of smart LED beads are connected to the wires, and the smart LED beads are integrated with logic control chips, which independently control the smart LED beads through address coding.

Preferably, the spherical lighting fixture further includes a control module communicatively connected to the logic control chips, configured to receive user commands and drive the LED light strings to generate preset patterns or user-defined patterns.

Preferably, the control module includes a wireless communication unit for receiving control signals from a mobile terminal, which runs a pattern editing software to real-time edit patterns and send them to the spherical lighting fixture; the wireless communication unit supports a plurality of wireless communication protocols including WIFI®, BLUETOOTH®, and/or ZIGBEE®.

Preferably, the wire arrangement of the LED light strings includes: one wire continuously arranged along all support members, or a plurality of wires independently arranged along a plurality of support members.

Preferably, the spherical lighting fixture further includes: a plurality of clamping members, each clamping member is provided with a cable groove and a locking part; the LED light string is clamped in the cable groove, and the locking part locks the clamping member onto the support member.

Preferably, the clamping member is provided with a through guide hole, and the spherical lighting fixture further includes an adjusting zipper passing through each guide hole to fix all support members.

Preferably, the support member is provided with a mounting groove or an adhesive part for the LED light string to fix the LED light string and prevent it from falling off.

Preferably, the support member is made of metal material, plastic material, or composite material.

Preferably, the support member adopts a gradient stiffness design, including:

- a rigid inner core, made of aviation aluminum alloy;
- a flexible outer layer, coated on an outer surface of the rigid inner core, made of silicone composite material.

Preferably, the annular base is equipped with a hanging component for stably suspending the spherical lighting fixture at a predetermined position; meanwhile, the annular base is also provided with a fixing component for fixing the hanging component, and the fixing component is combined with the annular base through threaded connection, snap connection, or welding.

The invention has the following advantageous effects: through the integration of innovative structural design and intelligent control technology, the invention brings a plurality of improvements in technical effects: first, in terms of intelligent and programmable lighting control, by integrating the logic control chips in the LED light string and combining address coding technology, independent control of each smart LED bead is achieved, enabling effects such as adjustable light changes, multi-pattern rotation, and color gradients, significantly enhancing the playability, interactivity, and artistic expressiveness of the lighting fixture. Second, in terms of structural assembly and maintenance convenience, the modular spherical support frame composed of concentric annular bases and pluggable support members not only improves structural stability but also enables efficient and convenient installation and disassembly, greatly reducing the complexity of transportation, assembly, and later maintenance.

BRIEF DESCRIPTION OF DRAWINGS

In order to illustrate the preferred embodiment of the invention or the technical scheme more clearly, the technical scheme of the preferred embodiment or the figures required by the prior art is further described briefly. Obviously, only partial embodiments of the invention are shown and the actual structure is not limited thereto. It is to be understood by those skilled in the art that other drawings can be obtained based on the drawings of the invention with non-creative labor.

Figure 1:
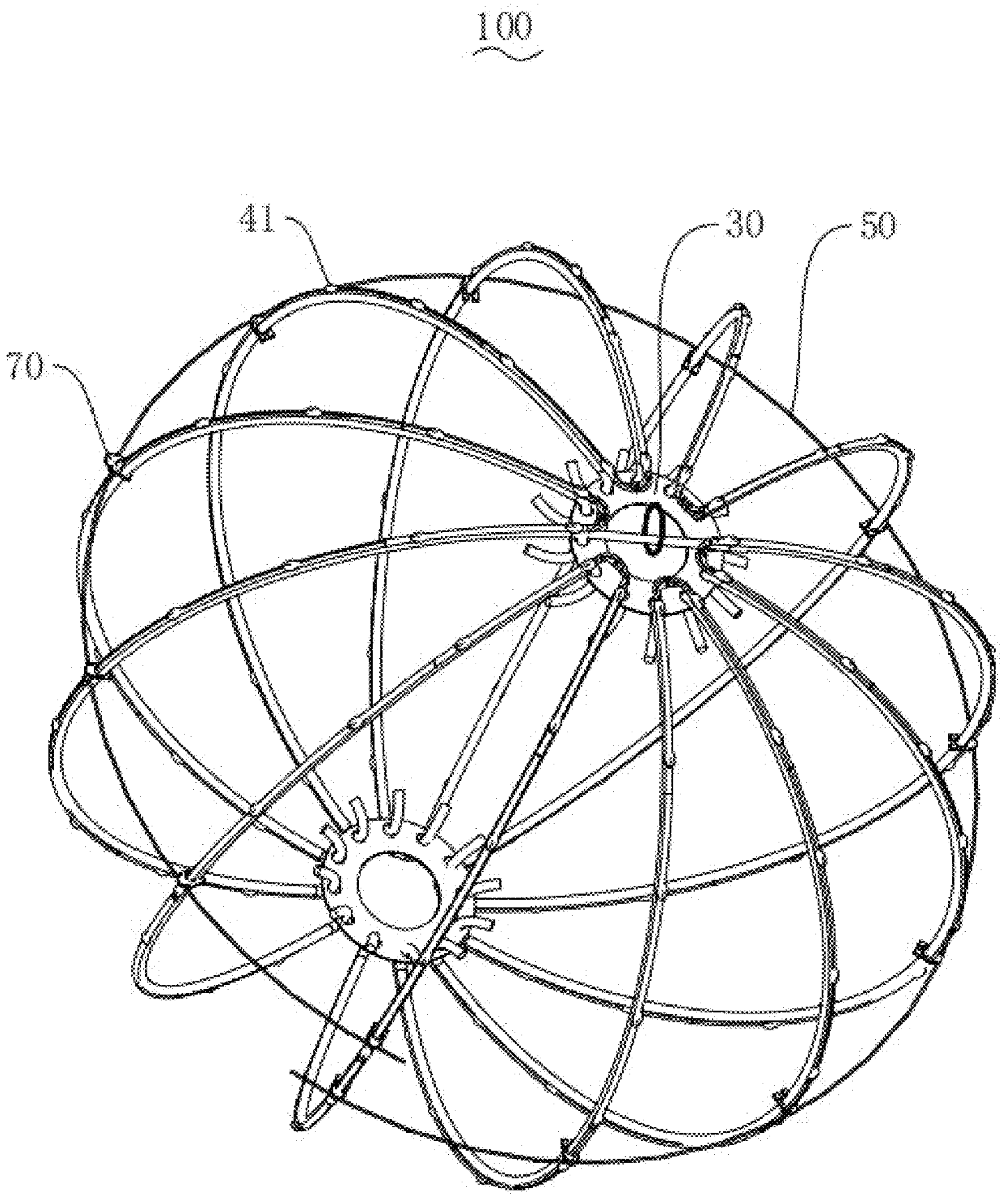
FIG. 1 is a schematic diagram of the external appearance of the spherical lighting fixture according to an embodiment of the invention.
Figure 2:
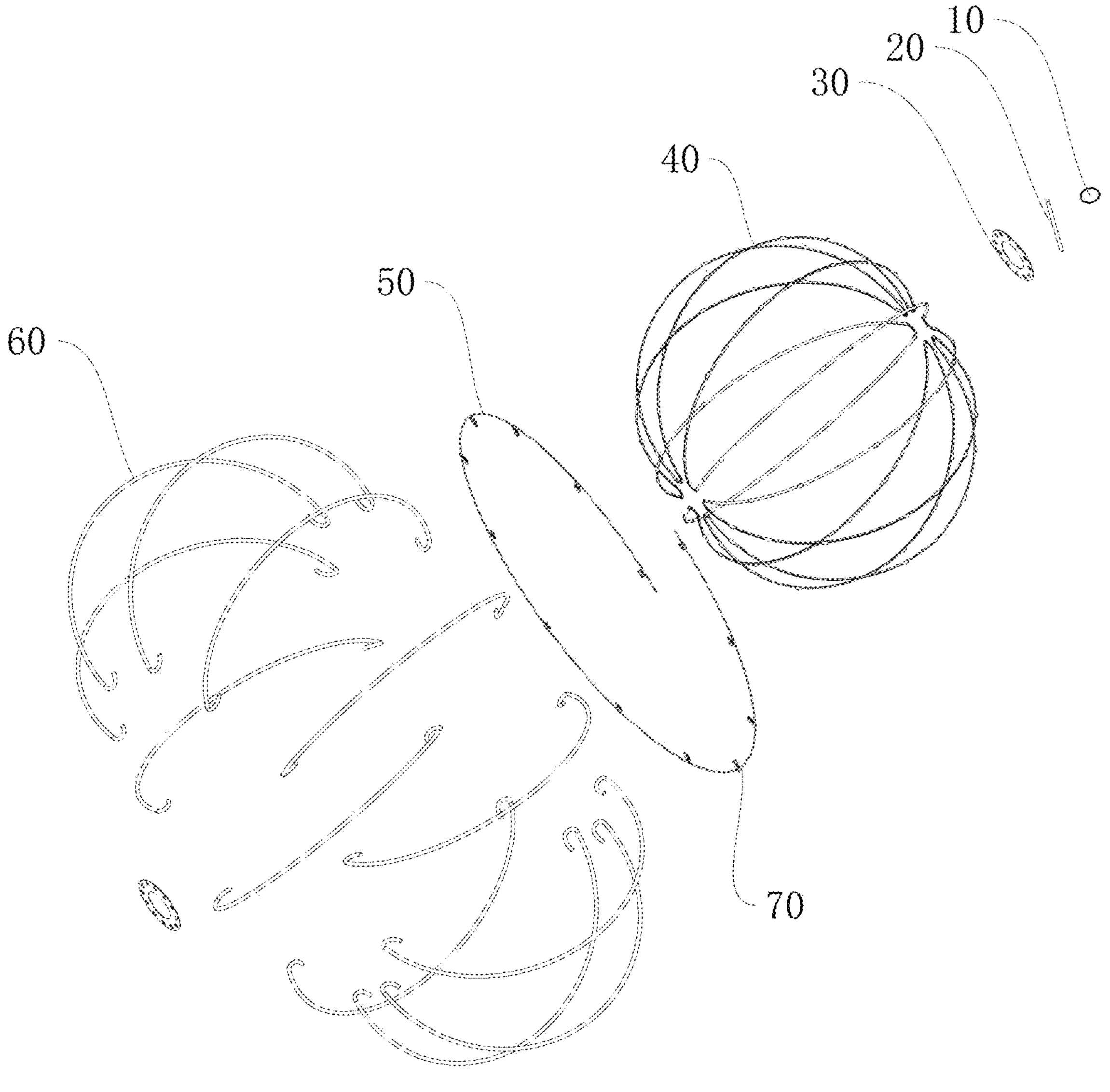
FIG. 2 is an exploded view of the spherical lighting fixture according to an embodiment of the invention.
Figure 3:
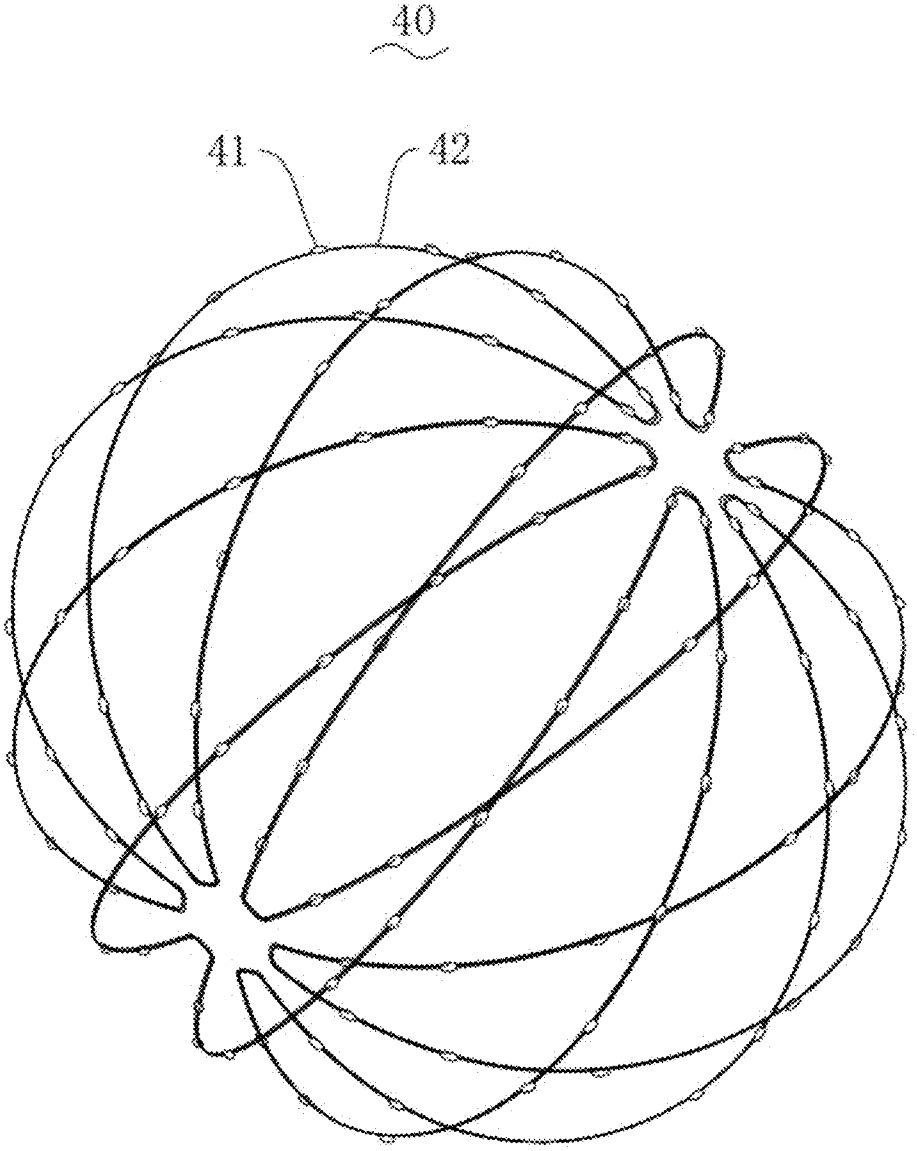
FIG. 3 is a schematic diagram of the LED light string of the spherical lighting fixture according to an embodiment of the invention.
Figure 4:
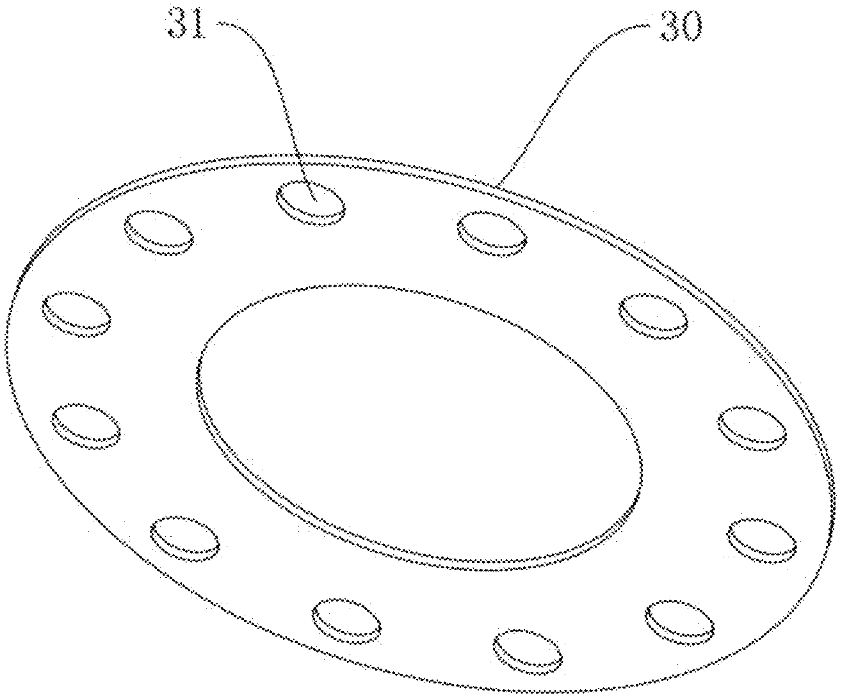
FIG. 4 is a schematic diagram of the external appearance of the annular base of the spherical lighting fixture according to an embodiment of the invention.
Figure 5:
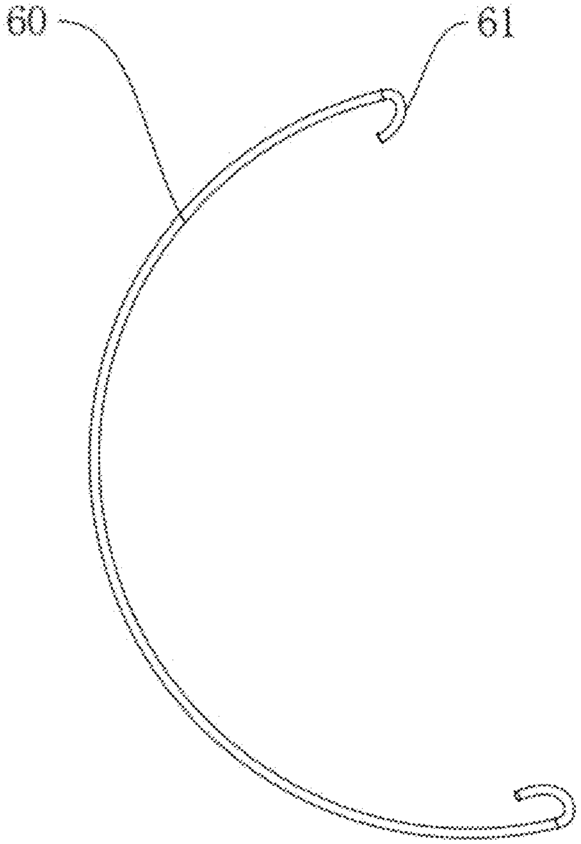
FIG. 5 is a schematic diagram of the external appearance of the support member of the spherical lighting fixture according to an embodiment of the invention.

As shown in the accompanying drawings: 100 spherical lighting fixture; 10 hanging component; 20 fixing component; 30 annular base; 31 mounting hole; 40 LED light string; 41 smart LED bead; 42 wire; 50 adjusting zipper; 60 support member; 61 end; 70 clamping member; 71 locking part; 72 cable groove; 73 guide hole.

SPECIFIC EMBODIMENT OF THE INVENTION

To facilitate understanding of the invention, the following provides a more comprehensive description with reference to the related drawings, which illustrate preferred embodiments of the invention. However, the invention may be implemented in many different forms and is not limited to the embodiments described herein. Unless otherwise defined, all technical and scientific terms used herein have the same meaning as commonly understood by those skilled in the art. The terms used in the specification of the invention are for describing specific embodiments only and are not intended to limit the invention.

With reference to FIG. 1 to FIG. 5, an embodiment of the invention provides a spherical lighting fixture 100, including: a fixing assembly composed of two concentric annular bases 30, with a plurality of mounting holes 31 evenly distributed in a circumferential direction of the annular bases 30; a plurality of support members 60, with plug-in structures adapted to the mounting holes 31 provided at their ends 61; the support members 60 are radially distributed along meridian direction and detachably connected to the fixing assembly through the plug-in structures, jointly forming a spherical support frame; LED light strings 40, with wires 42 of the LED light strings 40 arranged along the support members 60; a plurality of smart LED beads 41 are connected to the wires 42, and the smart LED beads 41 are integrated with logic control chips, which independently control the smart LED beads 41 through address coding.

In this embodiment, it should be noted that the core structure of the spherical lighting fixture 100 includes: a fixing assembly composed of two concentric annular bases 30, with mounting holes 31 evenly distributed in circumferential direction to ensure symmetrical layout of support members 60; a support frame in which a plurality of support members 60 are connected to the annular bases 30 through plug-in structures, radially distributed along the meridian to form a spherical frame, supporting quick disassembly and assembly; smart LED light strings 40 continuously arranged along the support members 60 to form a plurality of luminous rings; the beads are integrated with logic control chips to support independent address coding and control.

The technical solution of this embodiment, through the integration of innovative structural design and intelligent control technology, brings a plurality of improvements in technical effects: first, in terms of intelligent and programmable lighting control, by integrating the logic control chips in the LED light string 40 and combining address coding technology, independent control of each smart LED bead 41 is achieved, enabling effects such as adjustable light changes, multi-pattern rotation, and color gradients, significantly enhancing the playability, interactivity, and artistic expressiveness of the lighting fixture. Second, in terms of structural assembly and maintenance convenience, the modular spherical support frame composed of concentric annular bases 30 and pluggable support members 60 not only improves structural stability but also enables efficient and convenient installation and disassembly, greatly reducing the complexity of transportation, assembly, and later maintenance.

Further, the spherical lighting fixture 100 further includes a control module communicatively connected to the logic control chips, configured to receive user commands and drive the LED light strings 40 to generate preset patterns or user-defined patterns. The control module includes a wireless communication unit for receiving control signals from a mobile terminal, which runs a pattern editing software to real-time edit patterns and send them to the spherical lighting fixture 100. The wireless communication unit supports a plurality of wireless communication protocols including WIFI®, BLUETOOTH®, and/or ZIGBEE®.

The spherical lighting fixture 100 is also integrated with a control module and wireless communication function to achieve higher-level intelligent control. The control module is communicatively connected to the logic control chips in the smart LED beads 41, capable of accurately receiving user commands and controlling the LED light string 40 to generate preset or user-defined patterns, thereby achieving dynamic and controllable light output. In particular, the control module has a built-in wireless communication unit supporting a plurality of mainstream wireless communication protocols such as WIFI®, BLUETOOTH®, and/or ZIGBEE®, enhancing system compatibility and flexibility.

The technical solution of this embodiment allows users to run pattern editing software on a mobile terminal to real-time edit light patterns, set color change rhythms, or choreograph dynamic animations, and remotely send control commands to the spherical lighting fixture 100 via wireless means, achieving contactless, visual, and highly flexible control. This human-computer interaction mechanism not only improves user experience but also expands the application scenarios of the spherical lighting fixture 100 in commercial displays, stage performances, festival decorations, and other fields. Through the introduction of smart modules, the spherical lighting fixture 100 further demonstrates the high integration of light expressiveness and intelligent control capabilities.

In this embodiment, the wire arrangement of the LED light strings 40 includes: one wire 42 continuously arranged along all support members 60, or a plurality of wires 42 independently arranged along a plurality of support members 60.

In this embodiment, the wire arrangement of the LED light string has two flexible configuration forms: one is a single wire 42 continuously arranged along all support members 60, and the other is a plurality of wires 42 independently arranged along a plurality of support members 60. Different wiring methods can be selected according to actual application requirements. When using a single wire 42 for continuous arrangement, the number of connection nodes is minimized, reducing the probability of electrical faults caused by multi-point connections and simplifying the wiring process. This method is more conducive to achieving continuous overall address coding at the logic control level, facilitating unified identification and synchronous control of smart beads, and improving system response speed and control accuracy, suitable for scenarios with complex patterns and strong light fluidity. When using a plurality of wires 42 for independent arrangement, it has higher modular and zonal control capabilities, allowing each support member or different zones to be used as independent control units, facilitating local replacement, sectional maintenance, or zonal light effect programming, and enhancing system maintainability and scalability. This wiring method is particularly suitable for interactive lighting needs requiring grouped display or dynamic puzzle effects.

In summary, this embodiment provides two wire arrangement methods, balancing installation convenience, structural compactness, and control flexibility, not only improving the overall stability and functional expansion capabilities of the lighting fixture but also meeting users' customized control needs in different scenarios, with good adaptability and application prospects.

Figure 6:
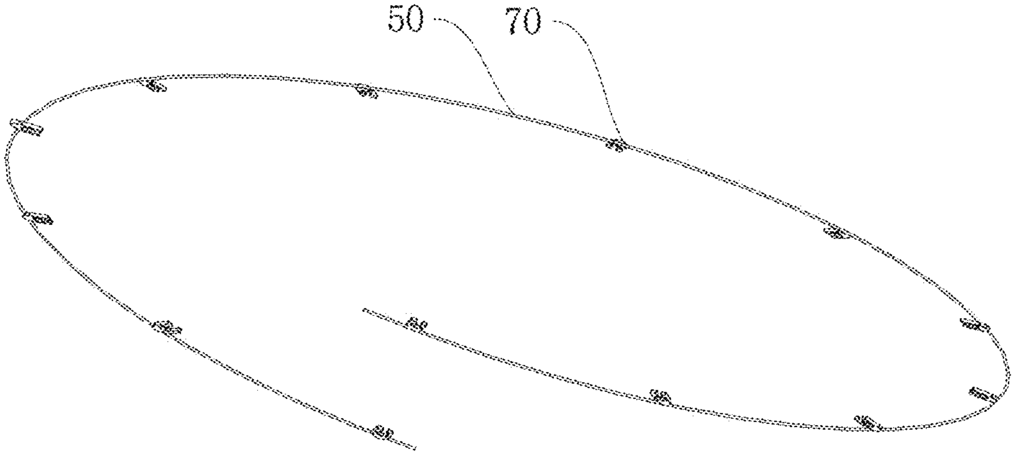
FIG. 6 is a schematic diagram of the external appearance of the adjusting zipper of the spherical lighting fixture according to an embodiment of the invention.
Figure 7:
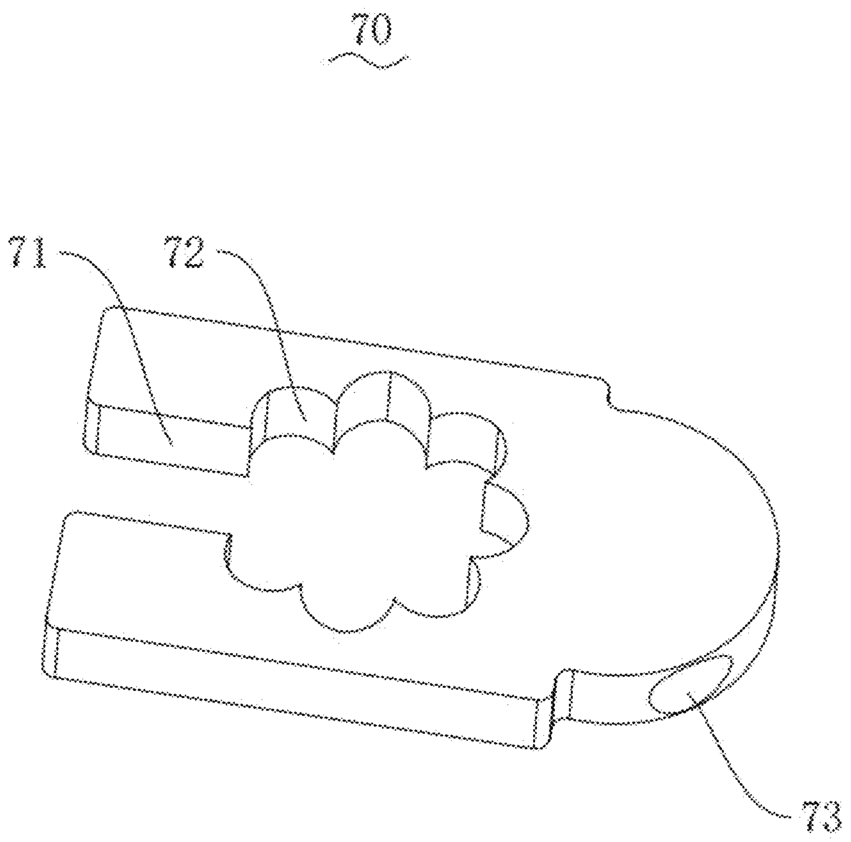
FIG. 7 is a schematic diagram of the external appearance of the clamping member of the spherical lighting fixture according to an embodiment of the invention.

As shown from FIG. 6 to FIG. 7, in a specific embodiment, the spherical lighting fixture 100 further includes:

a plurality of clamping members 70, each clamping member 70 is provided with a cable groove 72 and a locking part 71; the LED light string 40 is clamped in the cable groove 72, and the locking part 71 locks the clamping member 70 onto the support member 60; the clamping member 70 is provided with a through guide hole 73, and the spherical lighting fixture 100 further includes an adjusting zipper 50 passing through each guide hole 73 to fix all support members 60.

In this embodiment, to further improve the installation stability of the LED light string 40 and the overall structural stability, the spherical lighting fixture 100 further includes a plurality of clamping members 70 and an adjusting zipper 50. Each clamping member 70 is provided with a cable groove 72 and a locking part 71, wherein the LED light string 40 can be stably clamped in the cable groove 72 to prevent problems such as dislodging or displacement during use; the locking part 71 ensures that the clamping member 70 is firmly fixed on the support member 60, effectively restraining the light string and its wiring.

Additionally, the clamping member 70 is provided with a through guide hole 73, and by passing the adjusting zipper 50 through these guide holes 73, the support members 60 are further connected and fixed; wherein the clamping members 70 and the adjusting zipper 50 can be fixedly connected, or the clamping members 70 can be movably connected to the adjusting zipper 50, thereby forming a unified constraint on the overall structure and significantly enhancing the anti-deformation ability and overall stability of the spherical lighting fixture 100. The adjusting zipper 50 not only facilitates quick positioning and balanced tension but also allows for quick adjustment and release during transportation or maintenance.

The above design achieves the technical effects of more reliable light string installation, more stable structure, and more convenient maintenance, further optimizing the adaptability and reliability of the spherical lighting fixture 100 in various complex environments.

In an optional embodiment, the support member 60 is provided with a mounting groove or an adhesive part for the LED light string 40 to fix the LED light string 40 and prevent it from falling off.

In this embodiment, it should be noted that to further improve the installation reliability and service life of the LED light string 40 on the structure of the spherical lighting fixture 100, the support member 60 is provided with a mounting groove or an adhesive part for the LED light string 40. This structural design allows the light string to be embedded or adhered to a surface of the support member 60, forming a more stable assembly method, fundamentally reducing the risk of light string loosening, shifting, or even falling off caused by vibration, carrying, or long-term use.

The technical effect of this implementation lies in: by integrating a mounting groove or adhesive structure on the support member 60, the effective positioning and fixation of the LED light string 40 can be achieved without relying on additional fixing parts, making the overall structure more concise and beautiful, while also improving the assembly efficiency and use stability of the lighting fixture, especially suitable for scenarios with high requirements for installation reliability, such as outdoor displays, stage performances, or public space lighting installations.

In a specific embodiment, the support member 60 is made of metal material, plastic material, or composite material.

This embodiment provides a plurality of material selection schemes, which can be flexibly configured according to different application scenarios, cost budgets, and performance requirements.

The technical effects of this implementation are reflected in the following aspects: metal materials (such as aluminum alloy) have excellent mechanical strength and durability, suitable for occasions with high requirements for structural stability and long-term use reliability; plastic materials are lightweight, low-cost, and easy to process and form, suitable for consumer products with requirements for cost control and modeling complexity; composite materials have the characteristics of both light weight and high strength, particularly suitable for structural designs requiring both rigidity and flexibility, helping to improve the overall design freedom and performance balance of the product. By providing support members 60 of a plurality of materials, the spherical lighting fixture 100 can be flexibly deployed in diverse application environments, not only meeting structural strength requirements but also balancing light weight and aesthetics, enhancing the product's market adaptability and competitiveness.

In an optional embodiment, the support member 60 adopts a gradient stiffness design, including: a rigid inner core made of aviation aluminum alloy; a flexible outer layer coated on an outer surface of the rigid inner core, made of silicone composite material.

The technical effects of this design in terms of structure mainly include: the aviation aluminum alloy inner core has high stiffness and strength, ensuring that the support members 60 can maintain spherical frame shape when bearing the weight of the light strings and external disturbances, improving the overall stability and durability of the lighting fixture. The flexible silicone composite outer layer not only improves the overall hand feel and appearance texture of the lighting fixture but also effectively reduces the risk of injury caused by collisions during use, especially suitable for environments with high safety standards such as homes or public places. The flexible outer layer has good buffering performance, which can absorb certain external impact energy and reduce direct stress transmission to the internal structure, thereby prolonging the product's service life. The silicone outer layer has a high friction coefficient, facilitating the adhesion or embedding and fixation of the LED light string 40, further preventing the light string from slipping or falling off and improving the reliability and aesthetics of light source arrangement.

In summary, this gradient stiffness structural design not only optimizes mechanical properties but also balances appearance aesthetics, use safety, and light string fixation practicality, improving the product's comprehensive performance and user experience.

In a specific embodiment, the annular base 30 is equipped with a hanging component 10 for stably suspending the spherical lighting fixture 100 at a predetermined position. Meanwhile, the annular base 30 is also provided with a fixing component 20 for fixing the hanging component 10, and the fixing component 20 is combined with the annular base 30 through threaded connection, snap connection, or welding.

In this embodiment, by setting the hanging component 10 and its stable connection structure, the spherical lighting fixture 100 can remain firm and non-shaking during suspended use, improving overall safety and reliability in use, especially suitable for long-term suspension scenarios such as public lighting and exhibition installations. The fixing component 20 supports a plurality of connection methods (such as threads, snaps, welding), improving installation flexibility, and allowing suitable installation methods to be selected according to specific application scenarios and installation environments, meeting deployment needs under a plurality of scenarios and structural conditions. The structural design using snap or threaded connections facilitates quick assembly or replacement of the hanging component 10 by users, enabling easy movement and reuse of the lighting fixture in different positions and reducing maintenance and installation costs.

The above embodiments only represent several implementation modes of the present invention. Although their descriptions are specific and detailed, they should not be construed as limiting the scope of the invention. It should be noted that those of ordinary skill in the art can make several variations and improvements without departing from the concept of the invention, and these all fall within the protection scope of the present application.

What is claimed is:

1. A spherical lighting fixture, comprising:

a fixing assembly composed of two concentric annular bases, with a plurality of mounting holes evenly distributed in a circumferential direction of the annular bases;

a plurality of support members, with plug-in structures adapted to the mounting holes provided at their ends; the support members are radially distributed along a meridian direction and detachably connected to the fixing assembly through the plug-in structures, jointly forming a spherical support frame;

LED light strings, with wires of the LED light strings arranged along the support members; a plurality of smart LED beads are connected to the wires, which independently control the smart LED beads through address coding;

wherein the spherical lighting fixture further includes: a plurality of clamping members, each clamping member is provided with a cable groove and a locking part; the LED light string is clamped in the cable groove, and the locking part locks the clamping member onto the support member;

wherein each of the clamping members are provided with a through guide hole, and the spherical lighting fixture further includes an adjusting zipper passing through each guide hole to fix all support members.

2. The spherical lighting fixture of claim 1, wherein the wire arrangement of the LED light strings includes: one wire continuously arranged along all support members, or a plurality of wires independently arranged along a plurality of support members.

3. The spherical lighting fixture of claim 1, wherein the support members are made of metal material, plastic material, or composite material.

4. The spherical lighting fixture of claim 1, wherein at least one annular base is provided with a fixing component, and the fixing component is combined with the at least one annular base through threaded connection, snap connection, or welding.

* * * * *